United States Patent Office 3,838,048
Patented Sept. 24, 1974

3,838,048
POLYVINYLFLUORIDE BEARINGS
Thomas E. Hedge, Mentor, and Donald H. Wagner, Painesville, Ohio, assignors to Diamond Shamrock Corporation, Cleveland, Ohio
No Drawing. Continuation-in-part of abandoned application Ser. No. 737,382, June 17, 1968. This application May 13, 1971, Ser. No. 143,204
Int. Cl. C10m 7/28
U.S. Cl. 252—12                5 Claims

ABSTRACT OF THE DISCLOSURE

An abrasion resistant, thermoplastic resinous composition is prepared by dispersing from about 1 to about 100 parts by weight of a solid lubricant in about 100 parts by weight of a vinyl fluoride homopolymer or copolymer of vinyl fluoride and vinyl acetate. Useful solid lubricants include polytetrafluoroethylene, fluorinated ethylene propylene, molybdenum disulfide and tungsten disulfide. The composition forms a dry, abrasion resistant, cohesive lubricant film on a substrate.

CROSS-REFERENCE TO RELATED APPLICATIONS

This application is a continuation-in-part of copending application, Ser. No. 737,382, Hedge and Wagner, filed June 17, 1968, now abandoned.

BACKGROUND OF THE INVENTION

(1) Field of the Invention

The invention relates to an abrasion resistant, thermoplastic resinous composition having low coefficient of friction characteristics for forming a dry, abrasion resistant, cohesive lubricant film on a substrate. More particularly, this invention relates to a resinous coating composition for a substrate wherein a solid lubricant is dispersed in a vinyl fluoride homopolymer or copolymer.

(2) Description of the Prior Art

Thermoplastic coatings of vinyl fluoride homopolymers and copolymers exhibit numerous excellent properties such as weatherability, retention of desirable chemical and physical properties over a wide temperature range. One particularly outstanding property of these polymers is their exceptional abrasion resistance (resistance to wearing away of the polymer with repeated contact of foreign substances) when compared with other coating materials which has enabled utilization of these polymers where fraying surfaces are to be coated. A lower coefficient of friction than is currently available in these materials is desirable when coupled with their other outstanding properties, since this would result in coating compositions with a high degree of commercial utility.

Several materials exist which exhibit sufficient slip characteristics to be classified as solid lubricant materials. These materials are capable of exhibiting properties of a low surface coefficient of friction so that they will slide over fraying surfaces without galling, pitting or marring the other surface. Included in these materials are polytetrafluoroethylene (PTFE), fluorinated ethylene propylene (FEP), molybdenum disulfide and tungsten disulfide. These materials are in the form of discrete particles which do not lend themselves to a cohesive, wear-resistant coating with permanent adhesion. Further, these materials lack other significant properties which result in shortcomings in the utilization of the slip characteristics; in particular, some of these materials lack abrasion resistance and the brittle nature of some of these materials are drawbacks from their use where forming or shaping steps would be needed or desirable. Others of the above-listed materials are not capable of being used for coatings where low frictional properties are to be imparted to surfaces as these materials cannot be conveniently formed into coatings by themselves.

The drawbacks of the solid lubricant materials listed above have led persons interested in using their desirable nonstick properties to attempt to formulate the solid lubricant materials in another medium so that the new composition will have properties which are an improvement over either those of the solid lubricant alone or the other medium alone. One example has been to incorporate solid lubricants such as the molybdenum disulfide and tungsten disulfide into a polytetrafluoroethylene medium, but this still lacks desired abrasion resistance. Another example is set forth in U.S. Pat. 3,293,203 wherein a dispersion is formed for use as a low friction surface coating. The dispersion has a fluorocarbon polymer of fluorinated and fluoro-chlorinated polymers of $C_2$–$C_4$ olefins and at least one thermosettable resin with both the polymer and the resin being dissolved in an appropriate solvent. The resulting resin compositions are all thermosetting resins which have definite drawbacks where their utilization requires high flexibility and capacity for postforming operations. These resin compositions would be eliminated from application to metallic articles where postforming operations are required for shaping the metallic article because such postforming could result in rupture of the coating or separation of the coating from the metallic substrate.

SUMMARY OF THE INVENTION

In light of the foregoing, a principal object of this invention is to achieve a resin composition in a dispersion system or an extrusion system which will have a combination of desirable properties of very high abrasion resistance, good adhesion, very low surface friction characteristics, high flexibility and capacity for postforming operation which operation will not disturb the adhesion of the composition to the substrate.

An additional object of this invention is achieving a coating having a nonporous surface which will provide corrosion resistance and can be utilized on objects experiencing a wide range of temperature.

A still further object of this invention is to have a resin composition which is thermally responsive enabling coalescing of the resin as coatings on various substrates.

Other objects and applications of this invention well become readily apparent from a reading of the following specification and the appended claims.

The above and related objects of this invention are achieved by altering the surface properties of a thermoplastic polymer of poly(vinyl fluoride) (homopolymers and copolymers) by incorporating at least one solid lubricant in the matrix of the polymer which lubricant is selected from the group consisting of polytetrafluoroethylene (PTFE), fluorinated ethylene propylene (FEP), molybdenum disulfide and tungsten disulfide. The foregoing compositions can be prepared in extrusion grade resins or as dispersions with use of an appropriate solvent system. The solvent system must be capable of dissolving the selected thermoplastic fluorocarbon and incapable of dissolving the solid lubricant particles. Stabilizers appropriate for the applicable polymer composition can be incorporated along with pigment additives for coloration properties.

The term "thermoplastic poly(vinyl fluoride) resins" as used herein and in the appended claims is intended in its normally understood sense, to include all such resins, modified and unmodified, and compatible admixtures thereof, which harden or cure into a form having the property of becoming plastic under the application of heat, but are rigid at normally encountered temperatures and become plastic in each reapplication of heat.

Properties of vinyl fluoride polymers can be further modified by the addition of varying proportions of various monoethylenically unsaturate comonomers to obtain vinyl fluoride copolymers. Such copolymers are well known in the art. Properties of these vinyl fluoride copolymers are such that they are adaptable for use in the present invention. In particular, the copolymers of vinyl acetate and vinyl fluoride are useful in the preparation of the coated, molded and extruded articles disclosed in this invention.

These copolymers of vinyl fluoride can be copolymers of vinyl fluoride with other monoethylenically unsaturated monomers, copolymerizable therewith, wherein the vinyl fluoride is present in substantial or in major amounts, i.e., at least 60% to 95% of the total by weight. Examples are monoethylenic hydrocarbons, e.g., ethylene, propylene, isobutylene and styrene; halogen-substituted monoethylenic hydrocarbons, e.g., vinyl chloride, vinyl bromide, 1,1-dichloroethylene, 1,1-difluoroethylene, difluorochloroethylene, trifluorochloroethylene, tetrachlorethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., ethers, nitriles, amides, anhydrides and acid halides, including methyl methacrylate, beta hydroxyethyl methacrylate, allyl methacrylate, acrylonitrile, N-butyl methacrylamide, etc.; derivatives of maleic and fumaric acids, e.g., diethylmaleate and dimethylfumarate; propenyl esters, e.g., allyl acetate, isopropenyl acetate, etc. The presence in these copolymers of even a small percentage of a comonomer which, as a homopolymer, is normally more soluble in the selected latent solvent than is the homopolymer of vinyl fluoride, may render said copolymer sufficiently more soluble in aforementioned latent solvent as to permit its application on a substrate containing considerably less solvent or less active solvents than are needed in the application of homopolymers of vinyl fluoride.

Suitable thermoplastic vinyl fluoride polymers have an intrinsic viscosity of at least about 0.35 and preferably within the range of 0.4 to 2.0. The polymer particles in dispersion systems may comprise up to about 30 microns in diameter, preferably the diameter of the polymer particle is below about 20 microns. The size of the polymer particle may be controlled by conditions of polymerization or may be reduced by a variety of means known in the art, such as ball milling and grinding. Although particle sizes as low as 0.005 micron may be employed, it is preferable that the size of the dispersion particle be within the range of 0.05 microns to 10 microns. The particles in a given dispersion need not be uniform in size. For extrusion grade polymers, the size of the particle may be within the range of 10 to 500 microns and for extrusion grade polymers, the larger micron particles are preferred.

The solid lubricant particles of this invention when incorporated within a substrate of a thermoplastic vinyl fluoride resin as the discontinuous phase in the continuous resin phase function extremely satisfactorily as solid lubricant particles and these particles are firmly anchored and remain in place in a variety of friction applications. Suitable particles for this purpose may include one or more of the low friction finely divided particulate materials listed above.

The thermoplastic vinyl fluoride resins of this invention can have incorporated various pigment additives currently employed in dispersion and extrusion systems. Typical pigment additives include, but are in no way limited to, titanium dioxides, chromium oxides, iron oxides and chromium-copper-manganese oxides and the like.

In addition to the pigment or pigments, the dispersion systems may contain other finely divided solid pigments, pigment extenders, fillers or the like and other conventionally used compounding agents such as calcium silicate, antimony oxide, zinc sulfide, mica, china clay, mineral silicate and coloriferous agents. Also protective colloids and pigment dispersing or deflocculating agents, such as tetrasodium pyrophosphate or potassium tripolyphosphate may be employed.

Various stabilizers which are known to be useful in the improvement of the heat tolerance property of the thermoplastic vinyl fluoride films of this invention can be included in the formulation of the compositions of this invention. Included in this list for dispersion systems, which is not meant to be an exhaustive compilation, are the thiodialkanoic acid esters such as dilaurylthiodipropionate, polyols such as tripentaerythritol and dipentaerythritol, zinc dicyclohexyl dithiophosphinate and combinations of the foregoing. For the extrusion system a typical list of stabilizers would include, but is not in any sense limited to, aliphatic polyols, alkylated phenols, tri-(hydrocarbon)phosphite and combinations of the foregoing.

For the dispersion systems of the present invention, the latent solvents used have boiling points of at least about 120° C., preferably boiling points above about 120° C., but below the point at which the vinyl fluoride polymer begins to deteriorate or degrade. The latent solvent employed need not necessarily be liquid at room temperature provided its melting point is not so high that the temperature necessary for liquid blending of the latent solvent does not subject the polymer to thermal degradation.

Following are examples of specific compounds representative of the class of latent solvents useful in the process of the present invention: gamma butyrolactone, butadiene cyclic sulfone, tertamethylenesulfone, dimethylsulfone, hexmethylenesulfone, diallylsulfoxide, dimethylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethylacetamide, N,N-dimethylformamide, N,N-dimethyl-gamma - hydroxyacetamide, N,N-dimethyl-gamma-hydroxybutyramide, N,N-diethylacetamide, N,N-dimethylmethoxyacetamide, N-methylacetamide, N-methylformamide, N,N-dimethylaniline, N,N-dimethylethanolamine, 2-piperidone, N-methyl-2-piperidone, N-methyl-2-pyrrolidone, N-ethyl-2-pyrrolidone, N-isopropyl-2-pyrrolidone, 5-methyl-2-pyrrolidone, beta-propiolactane, delta-valerolactone, gamma-valerolactone, alpha-angelicalactone, beta-angelicalactone, epsilon-caprolactone, and alpha, beta and gamma-substituted alkyl derivatives of gamma-butyrolactone, gamma-valerolactone and delta valerolactone, as well as delta-substituted alkyl derivatives of delta-valerolactone, tetramethylurea, 1-nitropropane, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis-(methoxy-methyl)uron, methyl acetylsalicylate, diethyl phosphate, dimethyl phthalate, ethyl acetoacetate, methyl benzoate, methylene diacetate, methyl salicylate, phenyl acetate, triethyl phosphate, tris-(morpholino)-phosphine oxide, N-acetylmorpholine, N-acetylpiperidine, isoquinoline, quinoline, pyridine and tris-(dimethylamido)phosphate.

The proportions of vinyl fluoride polymer and dry lubricant particles may vary depending on the utilization of the polymer and the method of application desired. For the dispersion systems, the amount of latent solvent employed may vary depending on the utilization and method of application decided. The amount of latent solvent is adjusted to give a fluid or sometimes viscous composition that is of suitable consistency for application to the particular substrate which is to be coated. This, of course, will vary greatly according to the manner of application; for instance, whether it is desired to spray the dispersion on the substrate, to dip the substrate into the dispersion or to apply the dispersion on the substrate with some sort of roller system as well as other factors such as temperature, type of liquid dispersants employed, the finish of the surface to be coated and the like.

Generally, however, from about 1 to 100 parts, preferably about 5 to 50 parts, by weight, of solid lubricant particles per 100 parts of vinyl fluoride polymer have been found suitable and give the combination of properties desired. The stabilizer system may be incorporated into the resin system, depending upon the particular stabilizer, in stabilizing concentrations from about 0.05 to 12 parts, by weight, based on 100 parts, by weight, of polymer. The pigment is present in the resinous system within the range from about 5 to 50 parts, by weight, per 100 parts, by weight, of thermoplastic polymer. The latent solvent may be formulated into the dispersion systems within the range from 25 to 400 parts, by weight, per 100 parts polymer. Other ingredients which generally are employed in either extrusion systems or dispersion coating systems may be added to the resinous compositions of the present invention. Exemplary of these additives are thickening agents, i.e., polymethylmethacrylates, polymethylmethacrylate copolymers of acrylonitrile with methylmethacrylate, vinyl resins, cellulose acetate and the like; neutralizing agents, i.e., amines and the like.

The thermoplastic vinyl fluoride dispersion systems of the present invention may be prepared by a variety of mixing and blending procedures using mixing equipment such as Hobart mixers, Waring Blendors, ball mills, colloid mills, sand grinding equipment, Cowles dissolvers and the like. While the dispersions may or may not have pigment additives, they will be discussed as though there is pigment present in the dispersion. In one embodiment of this invention, a dispersion is prepared by making a master batch through mixing the pigment, solid lubricant particles, stabilizers, solvent and leveling agent in a ball mill for appropriate times. Then the master batch is added to the vinyl fluoride resin dispersed in a latent solvent in a Cowles dissolver with the mixture being blended for appropriate periods. In another embodiment, the solid lubricant particles are mixed with solvent to form a master batch; the pigment stabilizer and leveling agent are mixed with solvent to form another master batch and both master batches are mixed with the vinyl fluoride resin dispersed in latent solvent in a Cowles dissolver. A further embodiment has all the foregoing components being added to a ball mill with grinding with supplementing proportions of the components being added until the proper consistency of the dispersion is achieved. Another procedure has the pigment, stabilizer and solvent being mixed in a ball mill to form a master batch with the master batch, solid lubricant particles, latent solvent and vinyl fluoride resin being added to a Cowles dissolver for sufficient operating times to achieve the desired consistency to the dispersion.

For the extruded systems, the thermoplastic vinyl fluoride polymer system may be prepared by dry blending or hot milling the polymer, with or without pigment, and the stabilization system in powder or particulate form along with the solid lubricant particles in a wide variety of mixing and processing equipment, including Hobart mixers, Waring Blendors, Henschel mixers, two roll mills, Banbury mixers, extruders and the like. Typical preparation has the resin of thermoplastic vinyl fluoride polymer hot milled at 300°–500° F. on heated rolls with the stabilizer and solid lubricant being added and dispersed throughout the resin, with or without pigment as desired in the formulation, or dry blended at temperatures up to 350° F. with the stabilizer and solid lubricant also being worked into and dispersed throughout the resin, again with or without pigment as desired in the formulation. The thermoplastic vinyl fluoride polymer with incorporated stabilizer, solid lubricant and pigment is then further processed in extrusion means or injection molding means such as twin-screw extruders, extruders with vacuum and forced feed hoppers and screw-type molding machines. The composite is processed at sufficient temperature (250°–400° F.) and extruded or molded in desired shapes and sizes. Also, resultant films can be extruded and oriented through stretching processes.

The substrates which can be satisfactorily coated with the dispersion systems include metals, glass, wood, leather, rubber, plastics and the like. The substrates must be capable of withstanding the effects of the dispersing medium (solvent) and the temperatures used to cure the dispersions into films. While not required, the adhesion of the coating is sometimes enhanced, in general, by preliminarily roughening the surface such as by mechanical abrasion or by grit blasting, and where the substrate is metal, it is often desirable to use additional surface conditioning treatments to form thereon a coating of a metallic phosphate, oxalate, oxide or sulfide, or mixtures thereof or by treatments such as acid etching, chromate treatment and the like.

After the thermoplastic vinyl fluoride polymer systems of the present invention have been applied to a substrate, adhesion to the substrate is enhanced by employing heat to cure the dispersion system without discoloration or decomposition of the coating during baking. The heat curing of the pigmented vinyl fluoride polymer system may proceed by a method as generally disclosed in U.S. Pat. 3,317,336, which is hereby incorporated by reference. Alternatively, the thermoplastic vinyl fluoride may be heat cured in a single step through heating at an elevated temperature, generally in excess of about 450° F., for a sufficient period of time to effect adhesion of the coating to the substrate. Further, the dispersion system of this invention may be applied to the substrate to be coated by brushing, atomizing, spraying or dipping and reverse or direct roll coating. The coatings of this invention are best applied in relatively thin layers and where a relatively thick coating is desired the coating is preferably built up by applying thin multiple layers and fusing the coatings under proper conditions. For most application, a coating having a dry thickness in the range of about 0.1 to about 20 mils (multiple coatings for higher thicknesses) provides the most satisfactory over-all characteristics. A preferred dry film thickness is one within the range of about 0.3 to about 3.0 mils. After the desired thickness of coating is obtained by the above steps, the coating is finally cured by baking at a temperature which is sufficient to cure the particular thermoplastic vinyl fluoride resin employed.

The dispersion formulations of this invention may vary from relatively dilute to relatively concentrated materials, with the consistency capable of variation to suit the particular requirements. The compositions can be applied by spraying from pressurized atomization containers which may contain as low as about ½% solids. With suitable spraying apparatus, the solids content may be substantially increased, to a range of 25% or 35% solids, for example, but the compositions of this invention remain as stable dispersions at solids concentrations as high as about 50%. Relative quantities of resin solids and lubricant solids may vary over a relatively wide range as stated above depending upon the specific requirements for the particular coating. Varying proportions of the poly(vinyl fluoride) or vinyl fluoride polymer and lubricant within the ranges stated above produce variations in the ultimate coefficient of friction, adhesion, impact resistance, flexibility and wear life in the coating formed, and it will be understood that the optimum relative proportion of each component can be easily established by a few simple tests under the specific conditions of use when the final application is known and the desired properties of the finished coating are defined.

In order that those skilled in the art may more completely understand the present invention and the preferred method by which the same may be carried into effect, the following specific examples are offered:

EXAMPLE 1

A series of thermoplastic vinyl fluoride polymer dispersion systems which may contain pigments from various commercial sources and employing various stabilizers and solid lubricant additives are prepared having the following general recipe:

| Component: | Parts by weight |
| --- | --- |
| Thermoplastic vinyl fluoride polymer | 100 |
| Solid lubricant particles | 1–100 |
| Pigment | 0–50 |
| Stabilizer | 0–12 |
| Latent solvent (dispersion systems only) | 25–400 |

The thermoplastic vinyl fluoride polymer employed has an intrinsic viscosity of 0.4 to 2.0. The dispersions are prepared by first making a pigment slurry (when pigment is used) in solvent solution and then incrementally adding solid lubricant particles and stabilizer followed by polymer particles. The ingredients are ground in a ball mill for times up to 24 hours after which the dispersion is deaerated to remove all contained air. In addition, some dispersions have Micro-Cel C added to promote adhesion.

The formulations were sprayed on chromate pretreated (Bonderite 721) aluminum panels and zinc phosphate pretreated (Bonderite 891) steel panels. About four mils of wet coat were applied on room temperature substrates. The bake cycles were carried ut in an exhausted, forced circulation oven ranging from four to five minutes on aluminum and six to ten minutes on steel at 500° F., or until the visible solvent vapors disappeared and adhesion to the substrate was developed. The coatings were immediately water quenched after the bake cycle to reove residual heat. The dry films ranged from 0.8 to 1.2 mils in thickness. The particulars and data obtained from each run are given in Table 1 below. A discussion of the results follow Table 1.

The apparatus used for measurement of a coefficient of (sliding) friction consisted of a lathe fitted with a rigid upper load frame. An aluminum sled, 2″ x 4″ x 16″, was mounted on the saddle carriage of the lathe with the sled being drilled and tapped so the test panels could be firmly attached to the top surface of the sled. The sled was leveled and driven laterally by the lead screw of the lathe at a speed of 0.05 centimeters per second. A load normal to the test panel surface was applied by an air cylinder attached to the rigid upper frame. Two compression load cells measured the tangential force needed to overcome the friction and the normal force applied to slider. The slider was a highly polished stainless steel 1″ diameter disk. In most cases, the frictional force was directly proportional to the load applied, so the coefficient of friction (ratio of tangential force to normal force) was virtually independent of the load. This apparatus is fully described in the Journal of Applied Physics, *34*, p. 342 (1963) by Charles Sieglaff and M. E. Kucsma.

To further evaluate the effect of these solid lubricant additives in the thermoplastic vinyl fluoride coatings on the nonstick or release properties of these coatings, the Instron Tensile Tester was used to measure quantitatively the force required to peel off No. 600 Scotch Brand Tape at a 90 degree angle from the coating. The peel strengths were converted to relative numbers, wherein 10 is a very high peel strength (maximum in this series) while 0 indicates no measureable peel strength. The results are given in the column labeled "Relative Strength of Adhesive Bond." A Taber Abraser was used to measure the abrasion resistance of the coatings. Two CS–17 wheels were used in measuring the weight loss of the coatings over 1,000 wear cycles with a 1,000 gram weight.

TABLE 1

| Parts of polymer [1] | Parts of solid lubricant | Stabilizer (parts) | Coefficient of sliding friction as coated on panel | Relative strength of adhesive bond | Resistance to abrasion in wt. loss (grams) |
| --- | --- | --- | --- | --- | --- |
| 100-PVF | 0 | [2] 0.8 | 0.17±0.02 (5 tests) | 8 | 0.012–0.013 |
| 100-PVF | 20-teflon (FEP) | 0.8 | 0.06–0.07 (3 tests) | 6 | 0.015–0.018 |
| 100-PVF | 18-WS$_2$ | 0.8 | 0.13–0.14 (3 tests) | 8 | 0.024–0.030 |
| 100-PVF | 18-MoS$_2$ | 0.8 | 0.11 (3 tests) | 6 | 0.031–0.040 |
| 100-PVF | 11-teflon (FEP) | 0.8 | 0.08–0.10 (3 tests) | 6 | 0.020–0.025 |
| 100-PVF | 11-teflon (PTFE) | 0.8 | 0.06 (3 tests) | 6 | 0.012–0.014 |
| 0-PVF | 100-teflon (PTFE) | None | 0.04 (3 tests) | 3 | 0.045–0.050 |

[1] The poly(vinyl fluoride) (PVF) employed is a homopolymer of vinyl fluoride.
[2] Stabilizer is 0.4 parts of tripentaerythritol and 0.4 parts of zinc dicyclohexyl dithiophosphinate.

From the foregoing table, the thermoplastic vinyl fluoride polymer coatings containing molybdenum disulfide, tungsten disulfide, "Teflon FEP" and "Teflon PTFE" had definite reductions in the coefficient of sliding friction. Nonstick or release properties of thermoplatsic vinyl fluoride polymer coatings containing the disclosed class of lubricants are much improved over that of thermoplastic vinyl fluoride coatings alone. The abrasion resistance of thermoplatsic vinyl fluoride coatings containing lubricants were superior to the abrasion resistance for "Teflon PTFE" coatings which are well established commercially as useful nonstick coatings.

EXAMPLE 2

In order to further demonstrate the effectiveness of the solid lubricant additives in dispersion systems of thermoplastic vinyl fluoride homopolymers, several homopolymer systems were formulated and tested with the following films in Table 2 being representative of those so formulated. The first column is the parts employed and identity of the homopolymer; the second column is the amount and identity of solid lubricant additive; and the third column is a relative measure of nonstick characteristics of the surface tested stated in contact angles (described in the following paragraph). The vinyl fluoride homopolymer presented is identical for all of the examples for purposes of comparison of the contact angles of each. In each instance the stabilizer employed is 0.4 parts tripentaerythritol and 0.4 parts zinc dicyclohexyl dithiophosphinate per 100 parts of polymer.

The contact angle is the angle within the water between the surface of a substrate and a line drawn tangentically to the surface of a droplet of water present on the surface at the point of three phases (liquid, air and substrate). In general, if a surface does not have wettable characteristics, it will have a very high contact angle as the liquid will bead up on the surface. If a surface does have wettable characteristics, it will have a very low contact angle as the liquid will spread upon the surface. Since the tendency for the liquid to spread increases as the contact angle decreases, the contact angle is a useful inverse measure of spreadability or wettability. The ability of a surface to be wetted by a material is considered one of the important factors in developing an adhesive bond between that surface and the other material coming in contact with it. Therefore, a high contact angle would indicate good nonstick surface properties. The contact angles were measured with water on the surface of the coating through use of a telescope horizontally mounted. The telescope is adapted with cross hairs and a protractor for reading of the contact angles.

TABLE 2

| Parts of polymer | Parts of solid lubricant | Contact angle, degrees |
| --- | --- | --- |
| 100-PVF | None | 38 |
| 100-PVF | 20-teflon (PTFE) | 95 |
| 100-PVF | 50-teflon (PTFE) | 102 |
| 100-PVF | 20-teflon (FEP) | 79 |
| 100-PVF | 50-teflon (FEP) | 91 |

This table shows a very pronounced increase in the relative nonstick properties of the coating surface as the solid lubricant content is increased up to 50 parts per 100 parts of vinyl fluoride polymer through use of a different measuring technique from that of Example 1.

EXAMPLE 3

In order to demonstrate the effectiveness of the solid lubricant additives in extrusion systems of thermoplastic vinyl fluoride copolymers, several copolymer systems were formulated with solid lubricant additives coated on substrates and tested with the following films in Table 3 being representative. The copolymer is 15% by weight of vinyl acetate with the remainder being vinyl fluoride in each instance so that variations in properties with the amount of solid lubricant additive is demonstrated. In Table 3 the first column is the description and the amount of the copolymer; the second column is the identity and amount of solid lubricant additive; and the third column is a relative measure of nonstick characteristics of the surface tested as stated in contact angles. The stabilizer system employed in each instance was a mixture of ½ part 2,6-di-tert-butyl-$p$-cresol, 1 part tripentaerythitol and 1½ parts tridecylphosphite per 100 parts copolymer.

TABLE 3

| Parts of copolymer | Parts of solid lubricant | Contact angle, degrees |
| --- | --- | --- |
| 100-PVF 15% vinyl acetate | None | 58 |
| 100-PVF 15% vinyl acetate | 20-teflon (FEP) | 70 |
| 100-PVF 15% vinyl acetate | 50-teflon (FEP) | 81 |

This table shows an increase in the relative nonstick properties of the coating surface as the solid lubricant is increased up to 50 parts per 100 parts of vinyl fluoride-vinyl acetate copolymer.

In light of the foregoing examples, it has been determined that a number of benefits are gained by dispersing solid lubricants in the thermoplastic poly(vinyl fluoride) polymers as set forth in this invention. Among these benefits is the fact that the temperature required to fuse these poly(vinyl fluoride) coatings (450°–500° F.) and to develop adhesion to a surface is substantially lower than the temperature needed to apply polytetrafluoroethylene (720°–820° F.) and fluorinated ethylene propylene (575°–750° F.) In addition, the resistance to abrasion of the resinous compositions of this invention is much greater than that for films of the materials used as solid lubricants in this invention and, in particular, for polytetrafluoroethylene and fluorinated ethylene propylene.

The superior corrosion resistance of the thin films of the present invention is felt to be from the individual particles flowing together and forming a homogeneous coating eliminating the pinholes and poor adhesion normally encountered in the other polymeric coatings on metal substrates known in the art. Steel panels coated with the films of Example 1 were subjected to salt spray tests according to the standard test B117–62 of the American Society for Testing Materials (ASTM) for 1,000 hours with the panels subsequently being visually inspected. The tests indicate that the films of Example 1 had excellent corrosion resistance with no weak points through pinholes or places of poor adhesion. It is known that coatings of polytetrafluoroethylene are characterized by a certain degree of microporosity which makes it difficult to obtain complete corrosion protection with thin coatings of this polymer.

It has further been determined that the coating properties of the instant invention can be designed to suit specific needs by adjusting the amount of dry lubricant added to the formulation. Of striking significance to commerce by virtue of cost differential, the thermoplastic poly(vinyl fluoride) coatings of the present invention with the dry lubricant additives have a marked price advantage to the customer for the same area of surface coated when compared with polytetrafluoroethylene equivalents. In particular, the advantages of the present coating would appear to offer users a specialized application coating with nonstick characteristics, corrosion resistance, strikingly low friction properties, with sufficient pliability and adhesion to permit subsequent forming operations. The polymers of this invention have a combination of properties and a cost advantage over all coating systems currently available on the market. In particular, it is felt that the coatings of the present invention would find potential application areas on the following types of equipment: conveyors, troughs, bins and tubs, chutes and hoppers, slides, shovels, pans and pails, funnels, strainers, mixers and agitators, lawn spreaders, metal boat hulls, snow blower housings, snow plow blades, outdoor signs, table tops, walls (industrial), press-fit parts, aluminum window guides, metal and woodworking tools, protective coatings, drawer-slides, rotary law mower housings, metal toboggan sliders, garden tools, heat exchanger surfaces, kitchenware and sleeve bearings.

It is to be understood that although the invention has been described with specific reference to particular embodiments thereof, it is not to be so limited, since changes and alterations therein may be made which are within the full intended scope of this invention as defined by the appended claims.

What is claimed is:

1. A thermoplastic bearing composition comprising a homopolymer of vinyl fluoride or a copolymer thereof containing up to 15 percent vinyl acetate, by weight, having dispersed therein a fluorocarbon resin which is polytetrafluoroethylene or fluorinated ethylene propylene polymer as a solid lubricant therefor, from about 5 to 50 parts, by weight of said solid lubricant being employed per each 100 parts of said vinyl fluoride homopolymer or copolymer.

2. The composition of Claim 1 wherein the polymer is a homopolymer of vinyl fluoride.

3. The composition of Claim 1 wherein the polymer is a copolymer of vinyl fluoride and vinyl acetate.

4. The composition of Claim 1 wherein the lubricant is fluorinated ethylene propylene.

5. The composition of Claim 1 wherein the lubricant is polytetrafluoroethylene.

References Cited

UNITED STATES PATENTS

| 3,288,710 | 11/1966 | Hollitz | 252—25 |
| 3,639,237 | 2/1972 | Curtis | 252—25 |
| 3,531,432 | 9/1970 | Graver | 252—25 |
| 3,445,393 | 5/1969 | Hinds | 252—25 |
| 3,257,317 | 6/1966 | Bre et al. | 252—12 |
| 3,454,517 | 7/1969 | Neros et al. | 252—12 |
| 3,429,844 | 2/1969 | Neros et al. | 252—12 |

DANIEL E. WYMAN, Primary Examiner

I. VAUGHN, Assistant Examiner

U.S. Cl. X.R.

72—42; 252—388, 389